United States Patent [19]

Fukasawa et al.

[11] Patent Number: 5,287,147
[45] Date of Patent: Feb. 15, 1994

[54] ORIGINAL SCANNING APPARATUS WITH FIXED LIGHT SOURCE

[75] Inventors: Motomu Fukasawa, Tokorozawa; Kazuo Fujibayashi, Kawasaki; Keisuke Araki, Tokyo, all of Japan

[73] Assignee: Canon Kabushiki Kaisha, Tokyo, Japan

[21] Appl. No.: 824,782

[22] Filed: Jan. 22, 1992

[30] Foreign Application Priority Data

| Jan. 25, 1991 | [JP] | Japan | 3-25722 |
| Feb. 18, 1991 | [JP] | Japan | 3-46153 |
| Aug. 1, 1991 | [JP] | Japan | 3-216066 |

[51] Int. Cl.⁵ .......................... G03G 15/04
[52] U.S. Cl. ...................... 355/233; 355/66
[58] Field of Search ............... 355/228, 233, 235, 47, 355/51, 66, 67; 358/497

[56] References Cited

U.S. PATENT DOCUMENTS

| 3,752,558 | 8/1973 | Lloyd | 355/235 Y |
| 3,758,774 | 9/1973 | Hildenbrandt | 355/233 Y |
| 4,473,865 | 9/1984 | Landa | 355/228 Y |
| 4,794,427 | 12/1988 | Shirai et al. | 355/49 |
| 4,859,043 | 8/1989 | Carel et al. | |
| 4,894,682 | 1/1990 | Kondo et al. | |

FOREIGN PATENT DOCUMENTS

| 54-42129 | 4/1979 | Japan |  |
| 54-133140 | 10/1979 | Japan |  |
| 55-135871 | 10/1980 | Japan | 355/67 |
| 58-115456 | 7/1983 | Japan | 355/67 |
| 59-126526 | 7/1984 | Japan | 355/67 |

Primary Examiner—Joan H. Pendegrass
Attorney, Agent, or Firm—Fitzpatrick, Cella, Harper & Scinto

[57] ABSTRACT

An original scanning apparatus comprising original support means on which an original is rested, elongated light source means for illuminating the original rested on the original support means, reflection means for reflecting light from the elongated light source means toward the original support means. The elongated light source means is fixed and the reflection means being shiftable, so that the original rested on the original support means is scanned by shifting the reflection means. Apparatus further includes side reflector means disposed at a longitudinal end of the elongated light source means and extending along a shifting direction of the reflection means.

35 Claims, 14 Drawing Sheets

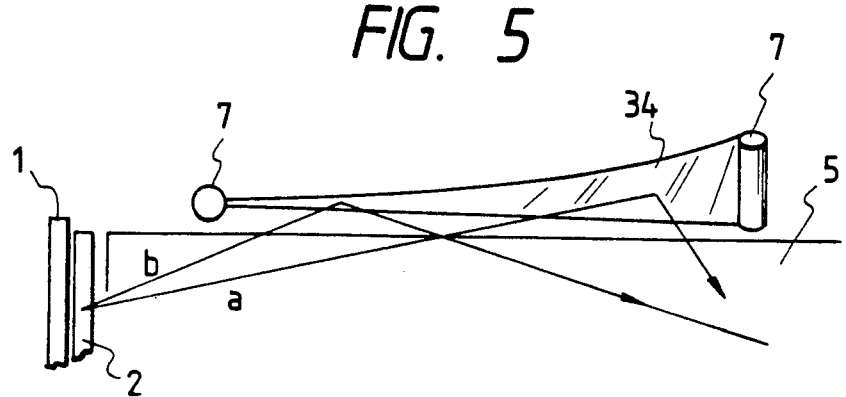
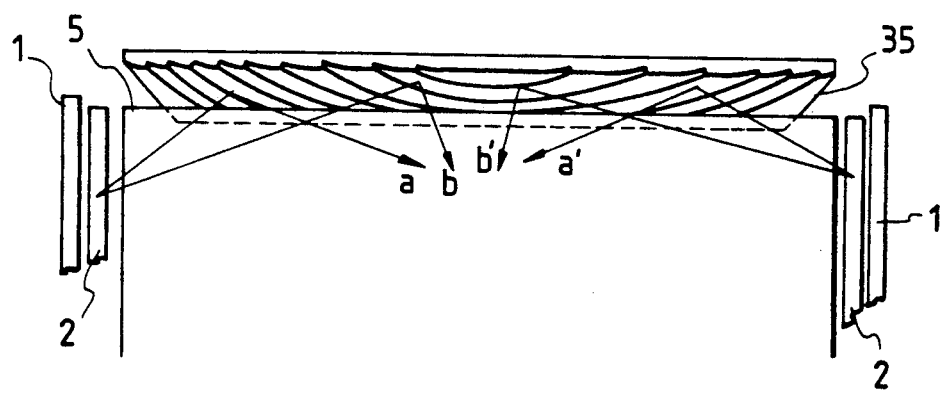

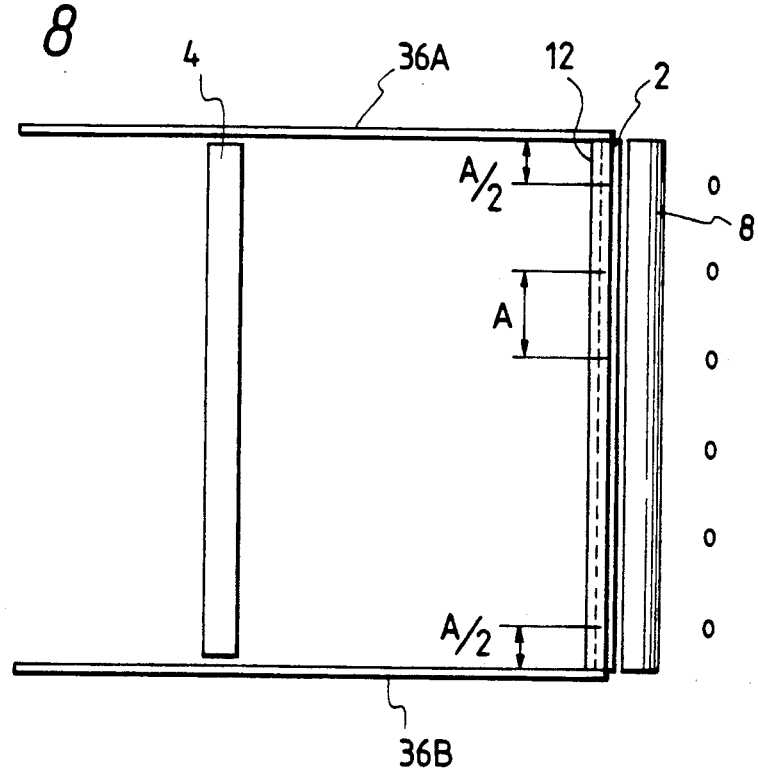

ORIGINAL SCANNING APPARATUS WITH FIXED LIGHT SOURCE

BACKGROUND OF THE INVENTION

1. Field of the Invention

The present invention relates to an original scanning apparatus used with a copying machine, image reader and the like, and more particularly, it relates to an apparatus for scanning an original by shifting a reflection member with respect to a fixed original support plate and a fixed light source.

2. Related Background Art

Conventional slit exposure apparatus wherein an original support plate and a light source are fixed are already known, as disclosed in the Japanese Patent Laid-open Nos. 54-133140, 54-42129 and the like. FIGS. 18 and 19 show examples of conventional illuminating or lighting equipment.

The lighting equipment shown in FIG. 18 includes an elongated light source 101 disposed at one side of an original. The lighting equipment further includes reflection mirrors 102a, 102b for reflecting light from the elongated light source. The reference numeral 103 denotes an original support plate; 104 denotes an original; and 105 denotes a shiftable reflection member for optically scanning the original 104 by shifting the light from the reflection mirror 102b horizontally. On the other hand, the lighting equipment shown in FIG. 19 includes light sources disposed at both sides of an original. The same constructional elements as those shown in FIG. 18 are designated by the same reference numerals.

By the way, in the above-mentioned conventional lighting equipments, there arose a problem that the brightness on a peripheral portion of the original, particularly on a lateral edge portion of the original extending along the elongated light source was decreased as the shiftable reflection member was shifted away from the elongated light source because of the increased distance between the light source and a slit exposure scanning position.

FIG. 20 shows the distribution of the brightness on the original when the original is illuminated from one side thereof as in the equipment of FIG. 18, and FIG. 21 shows the distribution of the brightness on the original when the original is illuminated from both sides thereof as in the equipment of FIG. 19. In both cases, the distribution of the brightness is shows as the equi-illumination curves or lines. In FIGS. 20 and 21, arrows a and b show a condition that the light beams emitted laterally from the light source 101 escape outwardly from the surface of the original, and the thick arrow indicates a low illumination portion.

The reduction in the intensity of illumination as mentioned above causes the fog phenomenon in the outputted image from the copying machine and the like, thus worsening the ability to copy with high quality. Further, since the light source is fixed, the light source can more easily be arranged near the original support plate in comparison with the case where the light source is shiftable. However, when the light source is an elongated light source comprised of a plurality of illuminous bodies arranged in a line, the unevenness in the amount of light (intensity of illumination) is generated on the surface of the original in correspondence with the pitch between the adjacent luminous bodies, and, thus, it is impossible to uniformly illuminate the original along the longitudinal direction of the elongated light source.

SUMMARY OF THE INVENTION

An object of the present invention is to provide an original scanning apparatus which can prevent the reduction in the illumination at a peripheral portion of an original due to a shifting movement of a reflection member.

Another object of the present invention is to provide an original scanning apparatus wherein pitch between luminous bodies of a lighting equipment are uniform.

A further object of the present invention is to provide an original scanning apparatus which can eliminate the unevenness in pitches between luminous bodies of an elongated light source.

Yet another object of the present invention is to provide an original scanning apparatus, comprising original support means on which an original is rested, elongated light source means comprised of a plurality of luminous bodies arranged in a line, and reflection means for reflecting light from the elongated light source means toward the original support means. The elongated light source means is fixed and the reflection means is shiftable, so that the original rested on the original support means is scanned by shifting the reflection means. Side reflector means is disposed at a longitudinal end of the elongated light source means and extends along a shifting direction of the reflection means.

A distance between the side reflector means and the outermost luminous body disposed at the longitudinal end of the elongated light source means is selected to be a half of a distance between the adjacent luminous bodies.

The other objects of the present invention will be apparent from the following description regarding the present invention.

BRIEF DESCRIPTION OF THE DRAWINGS

FIG. 5 is a partial plan view of an original scanning apparatus according to a fourth embodiment of the present invention;

FIG. 6 is a partial plan view of an original scanning apparatus according to a fifth embodiment of the present invention;

FIG. 8 is a plan view of the apparatus of FIG. 7;

DETAILED DESCRIPTION OF THE PREFERRED EMBODIMENTS

The present invention will now be explained in connection with embodiments thereof with reference to the accompanying drawings.

Figure 1:
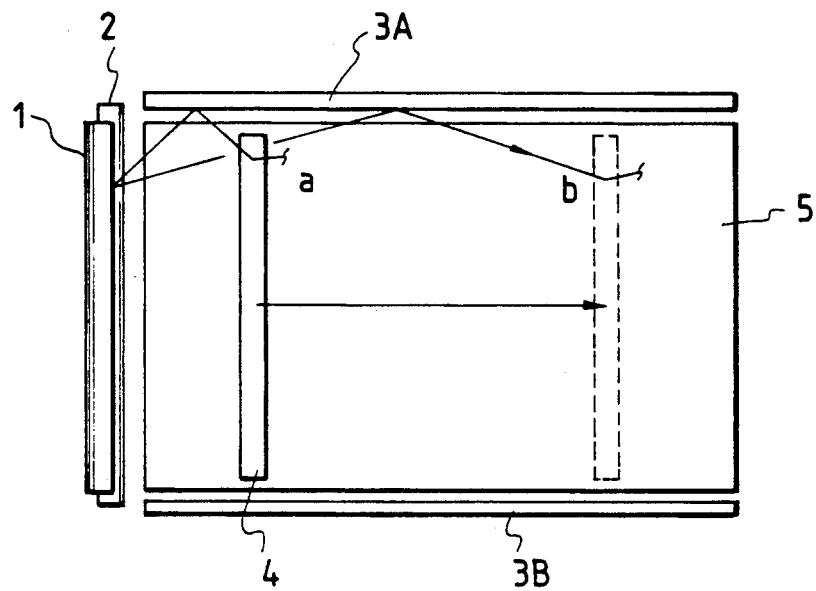
FIG. 1 is a plan view of an original scanning apparatus according to a preferred embodiment of the present invention.
Figure 2:
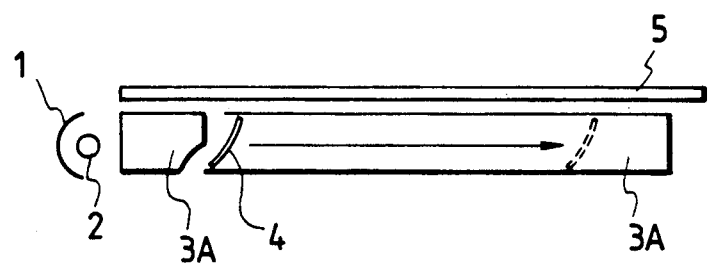
FIG. 2 is an elevational view of the apparatus of FIG. 1.

FIG. 1 is a plan view showing a construction of an original scanning apparatus according to a preferred embodiment of the present invention, and FIG. 2 is an elevational view of the apparatus of FIG. 1. In FIGS. 1 and 2, the original scanning apparatus according to this embodiment comprises an elongated light source 2 disposed at one side of an original support plate 5 and adapted to illuminate an original, a deflector means 1 disposed along a longitudinal direction of the elongated light source 2 and adapted to deflect light emitted from the elongated light source 2 along the original support plate 5 on which the original is rested, a concave or curved shiftable reflection member 4 shiftable to a direction parallel to the original support plate 5 and adapted to reflect light beams from the deflector means 1 toward the original support plate 5, and side reflectors 3A, 3B disposed at both ends of the elongated light source 2 along both lateral edges of the original support plate 5 in confronting relation to each other. The side reflectors 3A, 3B are positioned perpendicular to a surface of the original support plate 5 and extend along the whole original scanning area.

In operation, the light beams emitted from the light source 2 are deflected by the deflector means 1 to be directed to the direction parallel to the surface of the original support plate 5. Then, the light beams reach the shiftable reflection member 4, with the result that they are reflected onto the original support plate 5 as the shiftable reflection member 4 is shifted, so that the original on the original support plate is scanned with slit-exposure. In this case, as shown in FIG. 1, a part of the light beams as shown by the arrows a and b escapes laterally from the original support plate 5. However, these light beams a, b are reflected by the side reflectors 3A, 3B arranged at both lateral edges of the original support plate 5 to direct toward the underside of the original support plate 5 again, and then illuminate the surface of the original via the shiftable reflection member 4. In this way, since the light beams emitted laterally from the elongated light source 2 can effectively be utilized to illuminate the original, it is possible to prevent the reduction in the intensity of the illumination due to the difference in distance from the light source 2.

Next, another embodiment of the present invention will be explained.

Figure 3:
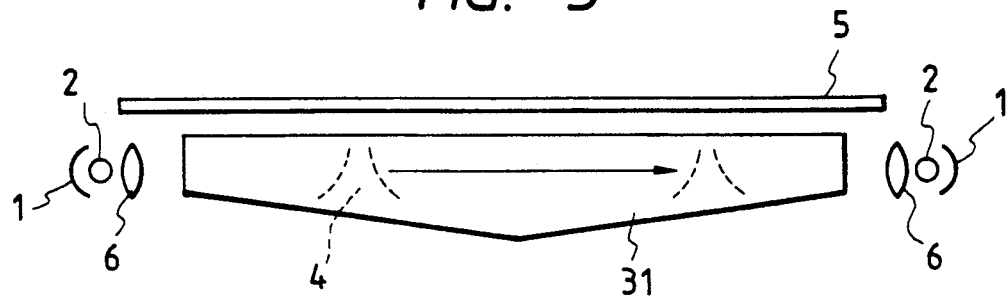
FIG. 3 is an elevational view of an original scanning apparatus according to a second embodiment of the present invention.

In the lighting equipment according to this embodiment, as shown in FIG. 3, an area of each side reflector is gradually increased depending upon the increase in the distance from the elongated light source. As shown in FIG. 3, in this embodiment, elongated light sources 2 and associated deflector means 1 and lenses 6 are disposed on both sides of the original support plate 5, and an area of each side reflector 31 is gradually increased from both ends to a central portion of the original support plate 5. With this arrangement, it is possible to preponderantly illuminate the low illumination portion of the original, thereby making uniform the intensity of illumination on the original surface.

Figure 4:
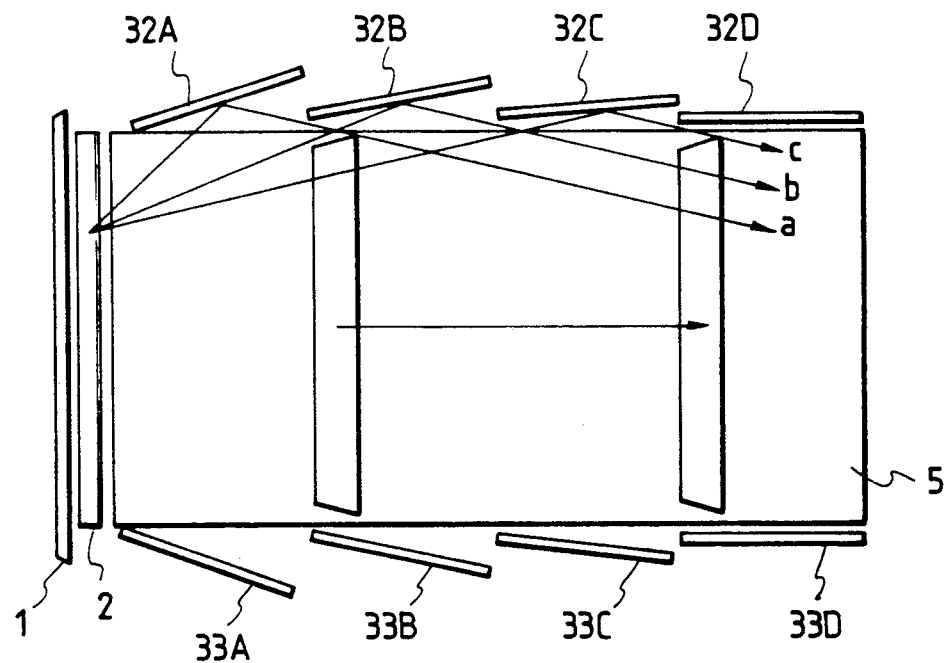
FIG. 4 is a plan view of an original scanning apparatus according to a third embodiment of the present invention.

FIG. 4 is a plan view showing a construction of a lighting equipment according to a further embodiment of the present invention. In this embodiment, side reflectors arranged at both lateral (longitudinal) edges of the original support plate 5 comprise a plurality of reflector segments 32A–32D, 33A–33D, respectively, and these reflector segments are variably inclined depending upon the distance from the elongated light source 2 so that the light beams a, b and c emitted laterally from the light source 2 are directed to the lowest illumination portion on the original surface. Incidentally, the side reflector segments 32A to 32D, 33A to 33D may comprise curved surface mirrors.

FIG. 5 is a plan view showing a construction of a lighting equipment according to a still further embodiment of the present invention. In this embodiment, left and right support members 7 for supporting each side reflector 34 are not parallel, but are angularly offset from each other. With this arrangement, since the reflection angle of the side reflector 34 is continuously varied from left to right (FIG. 5), it is possible to continuously correct the intensity of the illumination.

FIG. 6 is a plan view showing a construction of a lighting equipment according to the other embodiment of the present invention. In this embodiment, a Fresnel pattern is formed on each side reflector 35 to form a Fresnel type reflection member. With this arrangement, it is possible to finely correct or adjust the distribution of illumination regarding various portions of the original, with maintaining the compact construction.

Next, a preferred embodiment regarding a positional relation between the elongated light source comprising a plurality of luminous bodies arranged in a line and the side reflectors will be explained.

Figure 7:
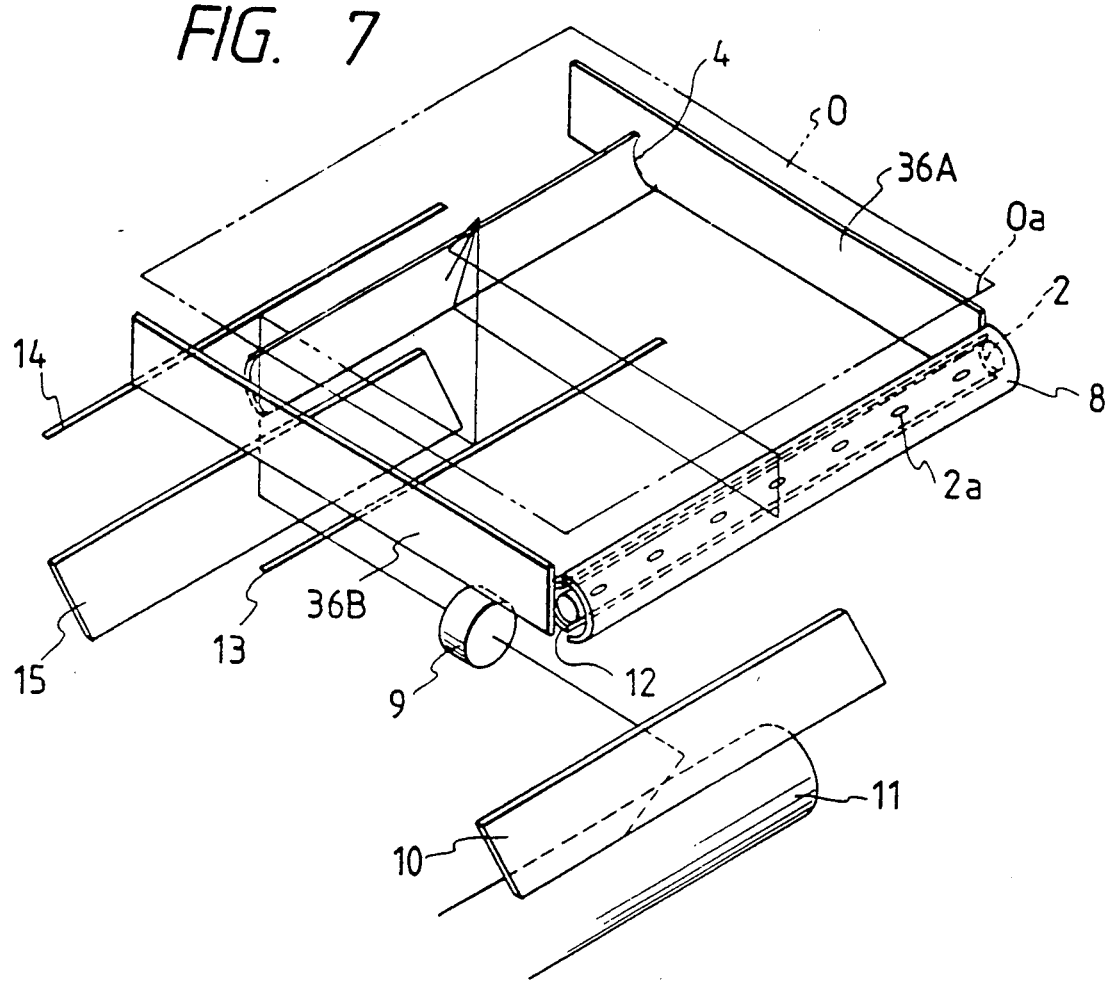
FIG. 7 is a perspective view of an original scanning apparatus according to a sixth embodiment of the present invention.

FIG. 7 is a perspective view of an original scanning apparatus to which this embodiment is applied.

In FIG. 7, an original 0 is rested on an original support plate of the original scanning apparatus. An elongated light source 2 is fixedly mounted near one end 0a of the original which is parallel to a slit for the slit exposure. A plurality of luminous bodies 2a are arranged in a line with a predetermined pitch A within the elongated light source 2. A cylindrical non-spherical surface mirror 8 is fixedly disposed in the vicinity of the elongated light source 2, to reflect light beams emitted outwardly from the elongated light source 2 toward a direction parallel to a surface of the original 0. The reference numeral 12 denotes a cylindrical concave mirror for returning light beams scattered from the elongated light source 2 directly toward the original to the elongated light source 2. Flat reflection mirrors 36A, 36B are provided for returning light beams emitted laterally from the elongated light source 2 to an effective area.

FIG. 8 is a plan view for explaining the arrangement of the flat reflection mirrors 36A, 36B shown in FIG. 7. These flat reflection mirrors are arranged perpendicular to both the elongated light source 2 and the original 0 and along both lateral edges of the original. That is to say, the flat reflection mirrors 36A, 36B are arranged at both ends of the elongated light source 2 comprising the plurality of luminous bodies 2a arranged in a line with the predetermined pitch A, in such a way that the flat reflection mirrors 36A, 36B are spaced apart from the respective outermost luminous bodies 2a in the elongated light source 2 by a distance A/2 (half-pitch), respectively. With this arrangement, it is possible to prevent the irregularity in the light amount within the illumination slit even when a first exposure mirror 4 (which will be described later) starts to be shifted from a position spaced apart from the elongated light source 2 and the scanning position of the first exposure mirror 4 is changed, because images of the luminous bodies (shown by white dots in FIG. 8) formed by the cylindrical non-spherical surface mirror 8 are lined up indefinitely with the pitch A by means of the flat reflection mirrors 36A, 36B. Unlike the arrangement as shown in FIG. 7, if the positions of the flat reflection mirrors 36A, 36B are changed, the irregularity in the light amount will occur within the illumination slit.

Figure 9A:
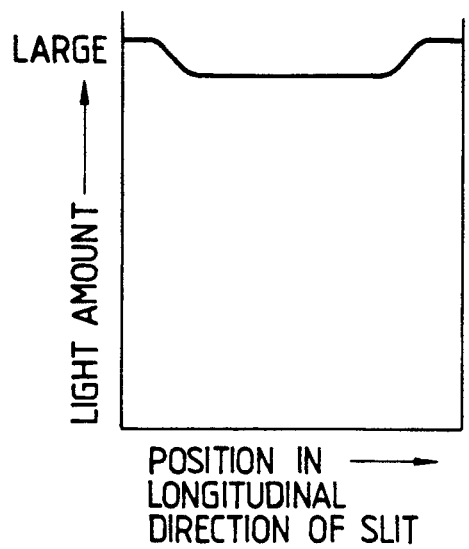
FIGS. 9A and 9B are views showing the change in the light amount due to the displacement of flat reflection mirrors.
Figure 9B:
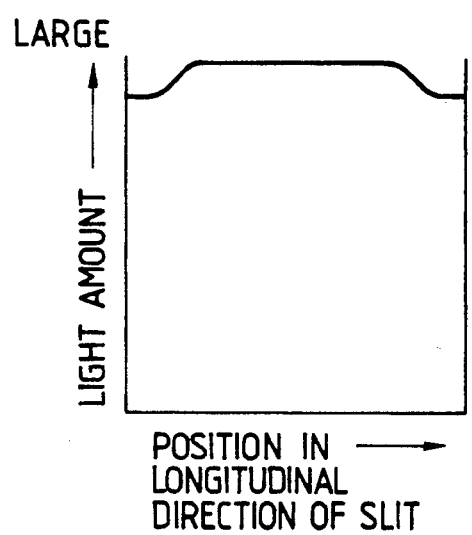

FIGS. 9A and 9B show how the light amount is influenced upon the change in the positions of the flat reflection mirrors 36A, 36B.

FIG. 9A shows the distribution of the light amounts in the slit when the flat reflection mirrors 36A, 36B approach the luminous bodies 2a at both ends of the elongated light source 2 so that a distance between each flat reflection mirror and the corresponding end luminous body becomes less than A/2 (half-pitch). In this case, it is found that the irregularity in the light amount occurs in such a way that the light amount is increased at both ends of the illumination slit. The reason is that the virtual images of the luminous bodies in the elongated light source 2 generated by the flat reflection mirrors 36A, 36B are concentrated only in the vicinity of the flat reflection mirrors 36A, 36B. To the contrary, FIG. 9B shows the distribution of the light amounts when the flat reflection mirrors 36A, 36B leave the luminous bodies 2a at both ends of the elongated light source 2 so that a distance between each flat reflection mirror and the corresponding end luminous body becomes greater than A/2 (half-pitch). In this case, the irregularity in the light amount occurs in such a way that the light amount is decreased at both ends of the illumination slit. The reason is that the virtual images of the luminous bodies in the elongated light source 2 generated by the flat reflection mirrors 36A, 36B are straggled only in the vicinity of the flat reflection mirrors 36A, 36B.

Now, briefly explaining the arrangement as an original reading system with reference to FIG. 7, the reference numerals 13, 14 and 15 denote second, third and fourth reflection mirrors for exposure, respectively; 9 denotes a focusing lens for exposure; 10 denotes a fifth reflection mirror for exposure; and 11 denotes a photosensitive drum. The above-mentioned elongated light source 2, cylindrical non-spherical mirror 8, cylindrical concave mirror 12, flat reflection mirrors 36A, 36B and first reflection mirror 4 constitute a lighting or illuminating unit as the light equipment wherein the original 0 is slit-illuminated by shifting the first reflection mirror 4. The light reflected from the original 0 is reflected by the second, third and fourth exposure reflection mirrors 13, 14, 15 to be sent to the focusing lens 9. The focused light image is reflected by the fifth exposure mirror 10 to be sent to the photosensitive drum 11, thus exposing the latter.

In the apparatus according to this embodiment having the above-mentioned construction, the original 0 is scanned by shifting the first reflection mirror 4 and the second exposure reflection mirror 13 integrally and by shifting the third and fourth exposure reflection mirrors 14, 15 integrally by the half of a shifting amount of the first and second reflection mirrors.

In FIG. 7, the light beams emitted from the elongated light source 2 are collected or condensed by the cylindrical non-spherical mirror 8 and the flat reflection mirrors 36A, 36B arranged at both sides of the original 0 to advance in a direction substantially parallel to the surface of the original 0. The light beams are collected by the first reflection mirror 4 as the cylindrical concave mirror to scan and illuminate the surface of the original 0 without generating the irregularity in the light amount.

Figure 10:
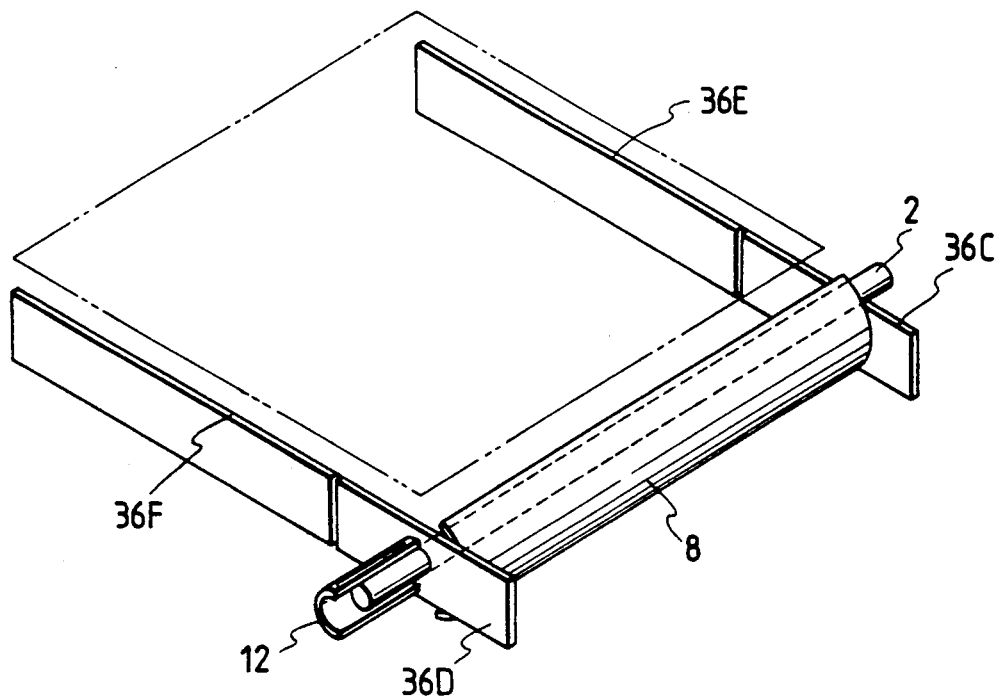
FIG. 10 is a perspective view of an original scanning apparatus according to a seventh embodiment of the present invention.

FIG. 10 shows a lighting equipment according to a further embodiment of the present invention. In the embodiment shown in FIG. 7, the flat reflection mirrors 36A, 36B each had a metallic base or substrate plate in consideration of the easy working and the heat-resisting ability because they had portions disposed near the light source. However, when the base plate is made of metal, it is difficult to obtain the flatness of the reflection mirror. Thus, in the embodiment of FIG. 10, the flat reflection mirrors are constituted by reflection mirror portion 36C, 36D each having a metallic base plate disposed near the elongated light source 2 and reflection mirror portions 36E, 36F each having a glass base plate disposed remote from the light source, respectively. With this arrangement, the flatness of the reflection mirrors can easily be attained, thus improving the stability of the light collecting ability to the effective illuminating area.

Figure 11:
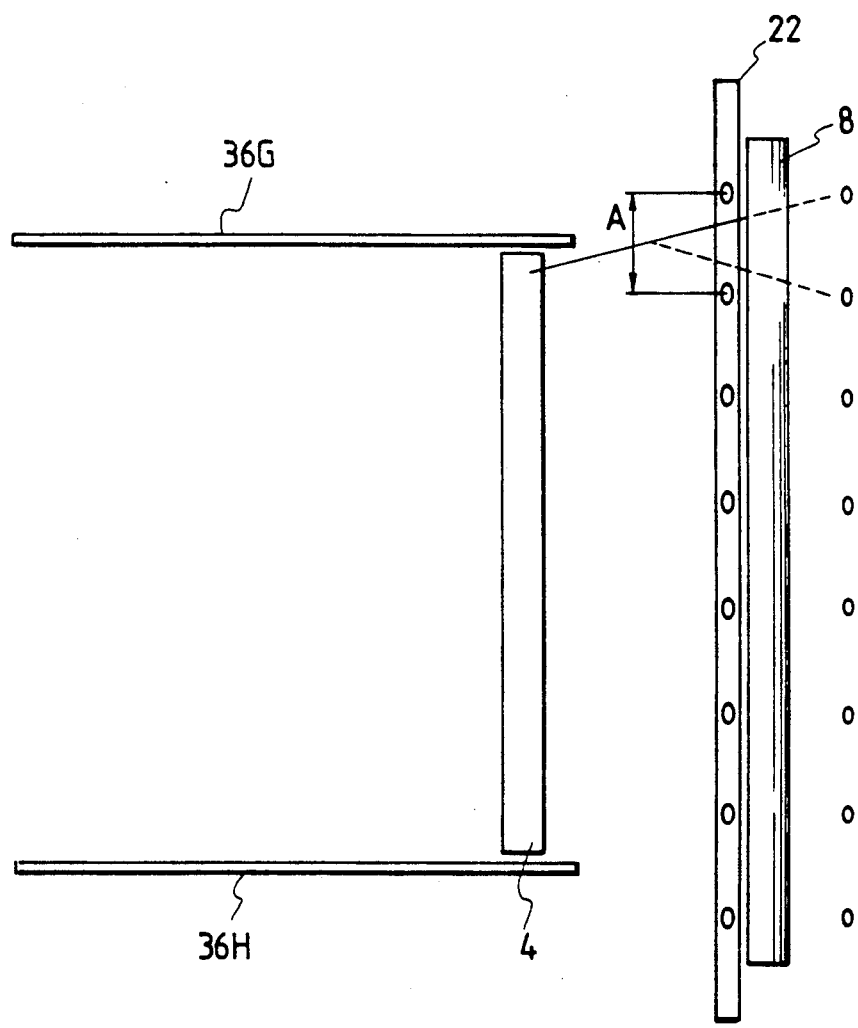
FIG. 11 is a plan view of an original scanning apparatus according to an eighth embodiment of the present invention.

FIG. 11 shows a still further embodiment of the present invention. In the embodiment shown in FIG. 7, the flat reflection mirrors 36A, 36B disposed at both sides of the original were extended near the elongated light source 2. However, in such a case, it is sometimes to difficult to support the elongated light source. Further, in the case where the luminous bodies of the elongated light source are arranged only between the two flat reflection mirrors as in the previous embodiments, when the scanning position of the first exposure reflection mirror 4 reaches the vicinity of the elongated light source 2, it is feared that the light beams are not adequately reflected by the flat reflection mirrors. Thus, in the embodiment of FIG. 11, the flat reflection mirrors arranged at both side of the original are constituted by flat reflection mirrors 36G, 36H having no portions disposed at both ends of the elongated light source.

As shown in FIG. 11, in this embodiment, luminous bodies in an elongated light source 22 extend beyond an area between the flat reflection mirrors 36G, 36H. Consequently, even if the scanning position of the first exposure reflection mirror 4 reaches the vicinity of the elongated light source, since the luminous bodies (filaments) positioned out of the above-mentioned area can cover the vignetting of the reflected light, it is possible to always maintain a condition that there is no irregularity in the light amount, regardless of the scanning position of the first reflection mirror.

Incidentally, the first reflection mirror 4 movable to perform the scanning as shown in FIGS. 7, 10 and 11 may be replaced by a plurality of reflection mirrors so as to be able to receive the light from both sides. With this arrangement, it is possible to illuminate the surface of the original from both side thereof, thus reducing the shadow on the original having the irregular surface.

Next, an embodiment which can prevent the occurrence of the irregularity in the light amount on an original support plate even when an elongated light source is arranged near the original support plate will be explained.

Figure 12A:
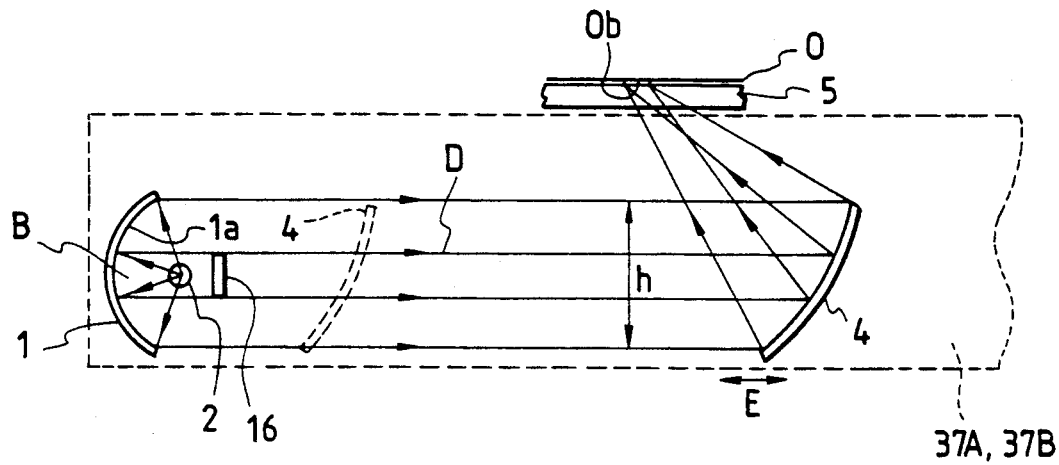
FIG. 12A is an elevational view of an original scanning apparatus according to a ninth embodiment of the present invention.
Figure 12B:
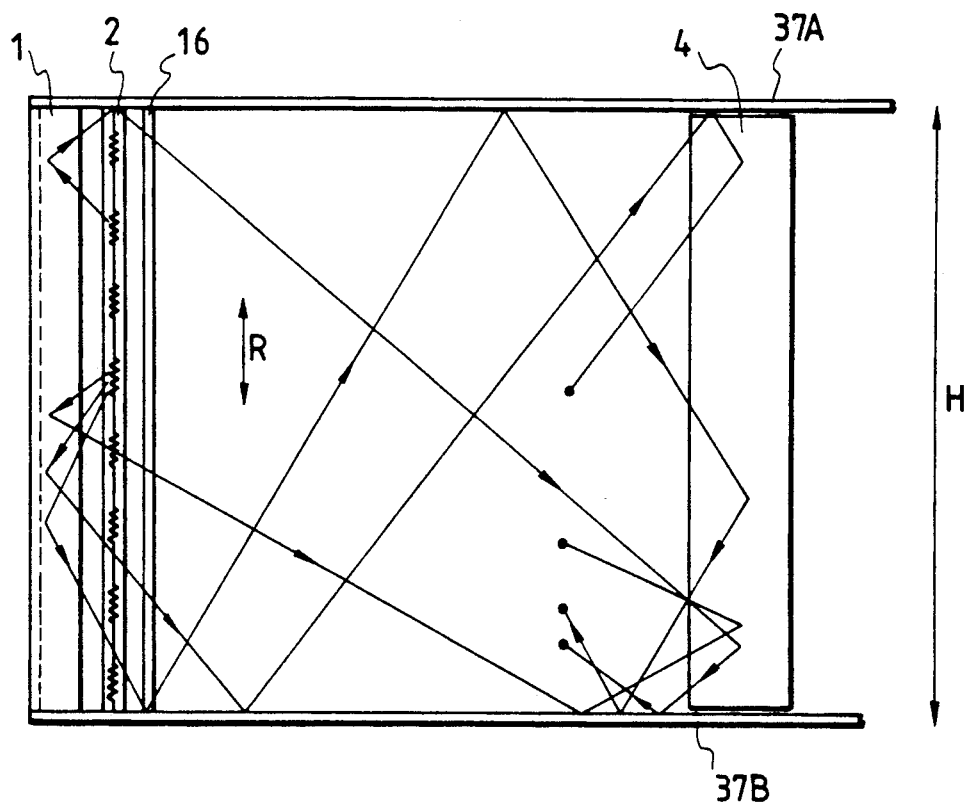
FIG. 12B is a plan view of the apparatus of FIG. 12A.

FIGS. 12A and 12B are elevational and plan views showing this embodiment, respectively. Light beams B emitted from the light source 2 comprising a plurality of fixed luminous filaments arranged in a line (a light source having a tubular wall surface of which the scattering treatment (frost treatment) is made is usually used as a halogen lamp for original illuminating of the copying machine and the like) is collected by a reflection means i.e., a reflection member 1 having a parabolic cylindrical surface 1a (or having an elliptic cylindrical surface to provide the light collecting ability more or less in consideration of the dimensions of the filaments) within an area corresponding to a height h of the reflection member.

Since the reflection member 1 is arranged parallel to the light source 2 and thus has no light collecting ability regarding a longitudinal direction R of the hood, the light beams are diverged as shown in FIG. 12B. However, since the diverged light beams are reflected by side reflector means i.e., side reflectors 37A, 37B arranged perpendicular to the light source 2 to be returned within an effective area corresponding to a dimension H of the longitudinal direction R of the light source, all of the light beams B are confined within a box-like area having the height h and the longitudinal width H.

The light beams B so confined are illuminated on a predetermined illuminating position 0b of the original 0 rested on the original support glass plate 5 in a slit pattern via a shiftable reflection means i.e., a scanning reflection hood 4 shifted in a direction parallel to the original support glass plate 5 i.e., in a direction shown by the arrow E below the original support glass plate 5. By shifting the scanning reflection member 4 from a scanning start position shown by the broken line to a scanning finish position shown by the solid line, the whole area of the original 0 is illuminated.

Incidentally, in FIGS. 12A and 12B, the reason why the heights of the side reflectors 37A, 37B are greater than the height h of the scanning reflection hood 4 and extend up to the vicinity of the lower surface of the original support glass plate 5 is that the light beams can be prevented from escaping out of the area defined by the longitudinal dimention H, thereby improving the lighting efficiency in the longitudinal direction and preventing the reduction in the light amount at both lateral end portions of the original, even when the light beams advance from the scanning reflection member 4 to the original 0.

By the way, regarding the distribution of the slit-patterned light beams along the longitudinal direction R, the pitch irregularity in the light amount corresponding to the pitch between the luminous filaments is detected (FIG. 13A) within area near the light source 2 (areas spaced apart from the light source by twice as short as the distance between the luminous filaments). However, so long as the light beams emitted from the filaments have no strong orientation and distribution feature, by equalizing a distance between the virtual images of the filaments generated by the side reflectors 37A, 37B and the corresponding end filaments substantially to the pitch between the filaments, it is possible to obtain the uniform distribution of the light amount at a position spaced apart from the light source 2 by twice as long as the distance between the filaments.

Figure 13A:
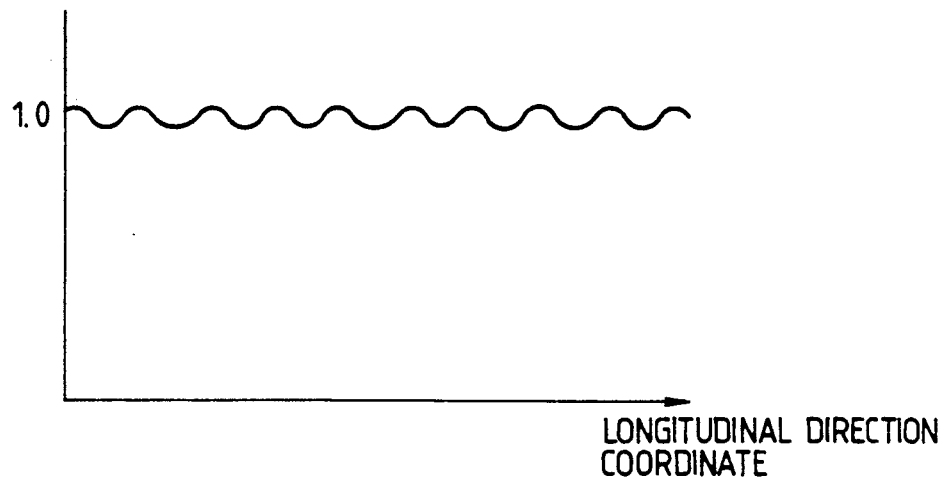
FIGS. 13A and 13B are graphs showing the distribution of the light amount along a longitudinal direction of an elongated light source.
Figure 13B:
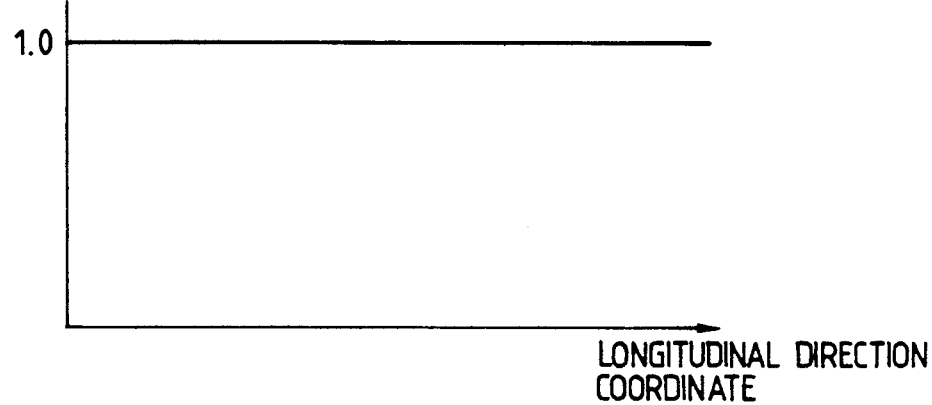

Thus, by arranging the light source and setting the scanning start position at the area (and beyond) where the pitch irregularity in the light amount corresponding to the filament pitch is eliminated, it is possible to obtain the uniform distribution of the light amount having substantially the same level from the scanning start position to the scanning finish position, as shown in FIG. 13B.

However, with the arrangement as mentioned above, since the light source is arranged remote from the scanning start position, it is difficult to make the apparatus small-sized.

The embodiment shown in FIGS. 12A and 12B eliminates such drawback. As shown in FIGS. 12A and 12B, a shield member 16 is disposed between the light source 2 and the scanning reflection member 4, so that the light beams not reflected by the parabolic cylindrical surface reflection hood 1 (among all of the light beams emitted from the light source 2) are prevented from striking directly against the scanning reflection member 4 and the original 0. Incidentally, the shield member 16 may have a reflection surface directing toward the light source 2 so as to increase the light amount directing toward the fixed parabolic cylindrical surface reflection hood 1.

With this arrangement, according to this embodiment, it is possible to arrange the light source near the scanning start position, thus reducing the width of the apparatus in the scanning direction.

Incidentally, in FIG. 12B, while only four light beams are illustrated regarding the light beams emitted from the filaments and scattered in the longitudinal direction R, it should be noted that, actually, such light beams are emitted from all of the filaments similarly; but, all of the light beams are not illustrated in this Figure for clarity's sake.

Figure 14A:
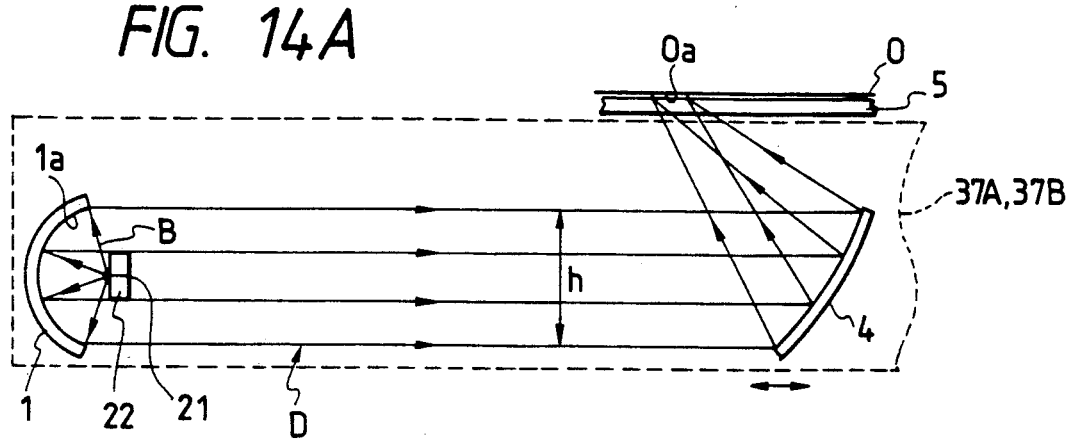
FIG. 14A is an elevational view of an original scanning apparatus according to a tenth embodiment of the present invention.
Figure 14B:
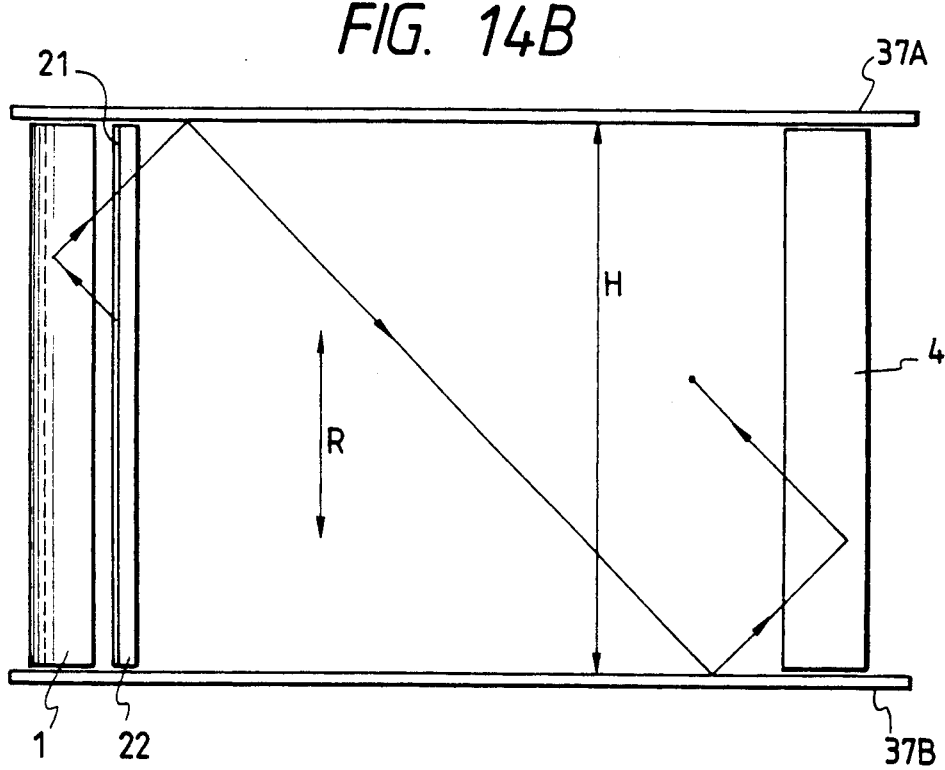
FIG. 14B is a plan view of the apparatus of FIG. 14A.

FIGS. 14A and 14B show a further embodiment of the present invention. In this embodiment, an elongated light source is constituted by the LED array 21. Unlike to the like source (OA halogen lamp) comprising a plurality of filaments as in the embodiment of FIG. 12, since the lined-up LED light source decreases the segment ripple as shown in FIG. 13A, it is possible to set the scanning start position nearer to the light source.

Further, the LED array 21 is attached to a base plate 22. Thus, by directing the LED array toward the reflection hood 1, the base plate also acts as the shield member similar to that shown in FIG. 12, with the result that it is possible to arrange the light source 21 nearer to the scanning start position.

Figure 15:
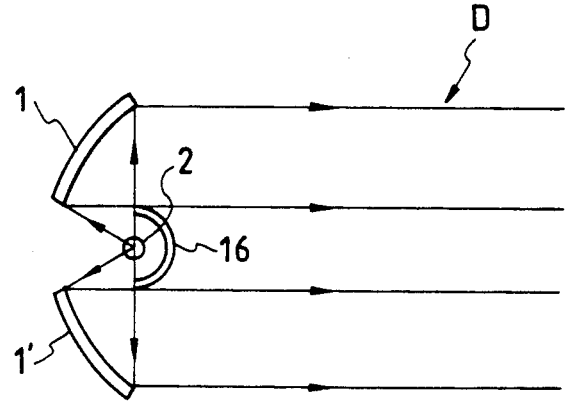
FIG. 15 is an elevational view showing an alteration of the apparatus of FIG. 12.

Incidentally, FIG. 15 shows an alteration of FIG. 12, wherein the reflection hood are divided into two reflection hood portions 1 and 1'.

Figure 16A:
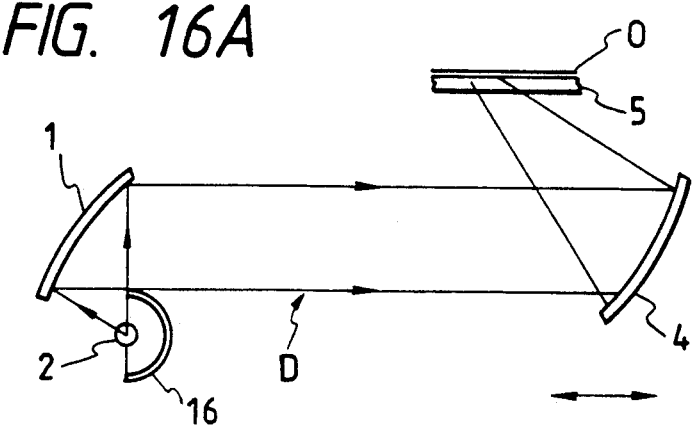
FIGS. 16A, 16B and 16C are elevational views showing further alterations of the apparatus of FIG. 12.

FIG. 16A shows a still further embodiment of the present invention. In this embodiment, the reflection hood 1 is constituted by only an upper half (upper reflection hood portion 1) of the reflection hood shown in FIG. 15. This embodiment can be applied in the case where the apparatus has the sufficient light amount. With this arrangement, it is possible to provide a lighting unit having a dimentions smaller than those of the embodiments of FIGS. 12, 14 and 15 in the height direction (up-and-down direction in FIG. 16A).

Figure 16B:
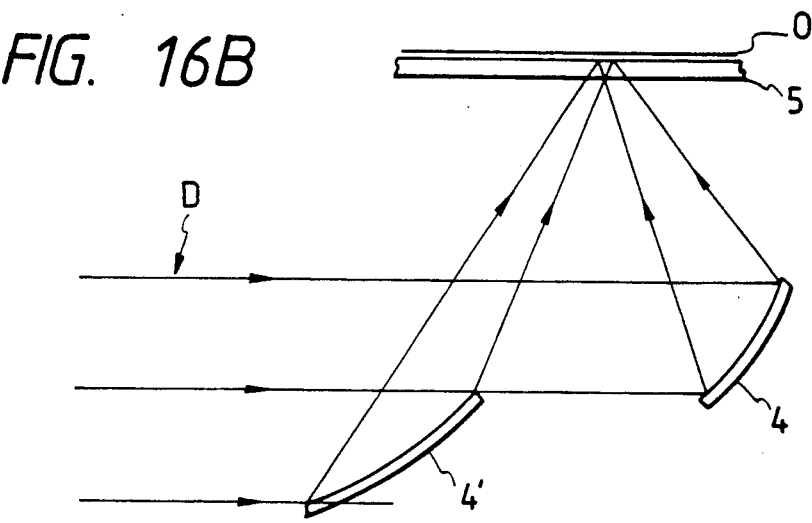
Figure 16C:
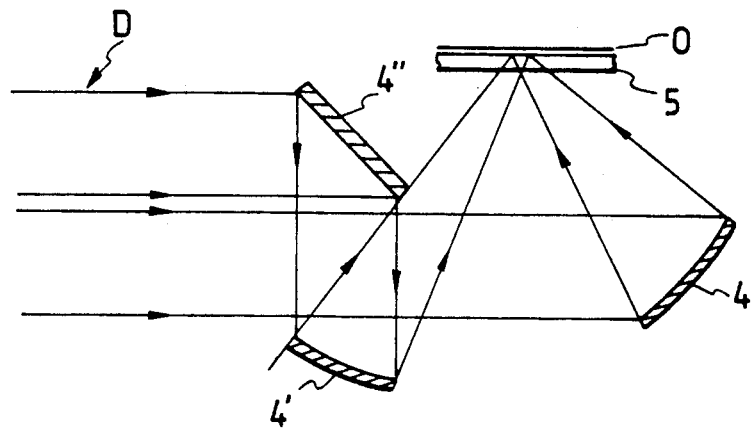

FIGS. 16B and 16C show further embodiments wherein the scanning reflection member 4 is constituted by a plurality of scanning mirrors. In the embodiment of FIG. 16B, the scanning reflection hood is constituted by two scanning mirrors 4, 4'; whereas, in the embodiment of FIG. 16C, the scanning reflection hood is constituted by three scanning mirrors 4, 4', 4". In these embodiments, the original is illuminated from both left and right sides with the light amount ratio of 5:5, so that the shadow on an original comprising sticked paper sheets can be eliminated. The apparatus according to the embodiment of FIG. 16C having three scanning mirrors has a smaller height than that of FIG. 16B, as shown.

By the way, in the embodiments of FIGS. 12 and 14, since the light beams B are blocked by the shield member 16 or the base plate 22 at a central portion of the reflection hood 1, such light beams cannot be utilized effectively. Now, embodiments wherein such light beams can effectively be utilized will be explained with reference to FIG. 17.

Figure 17A:
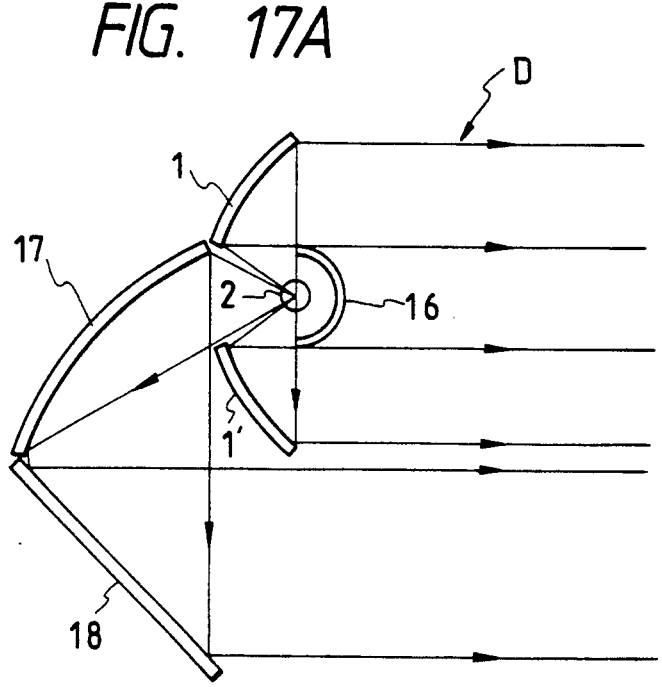
FIGS. 17A and 17B are elevational views showing alterations of the apparatus of FIG. 15.

In the embodiment shown in FIG. 17A, the reflection hood is divided into two reflection hood portion 1 and 1', and a fixed concave reflection hood 17 is disposed behind the reflection hood portions 1, 1'. Further, a flat mirror 18 is arranged below the concave reflection hood. With this arrangement, the light beams (emitted from the light source and) passed through between the reflection hood portions 1, 1' are collimated by the fixed concave reflection hood 17 in a direction perpendicular to the parallel light beams D and then are reflected by the flat mirror 18 toward a direction parallel to the parallel light beams D.

Figure 17B:
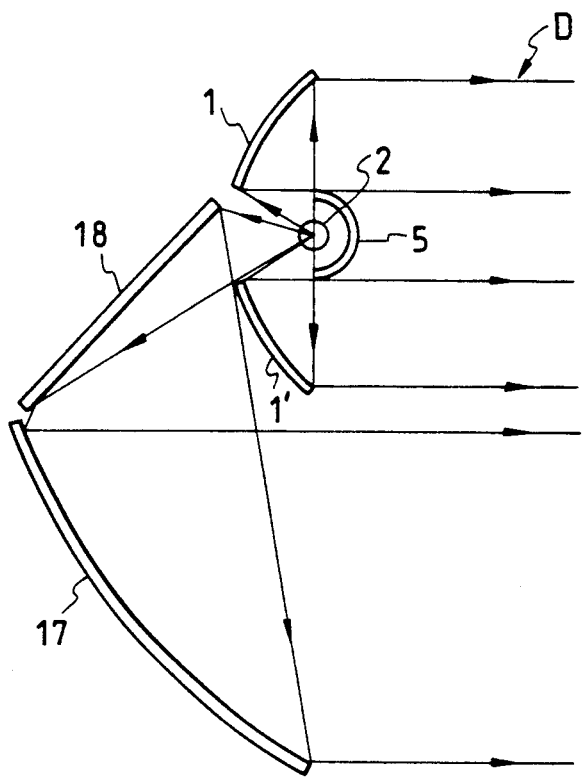
Figure 18:
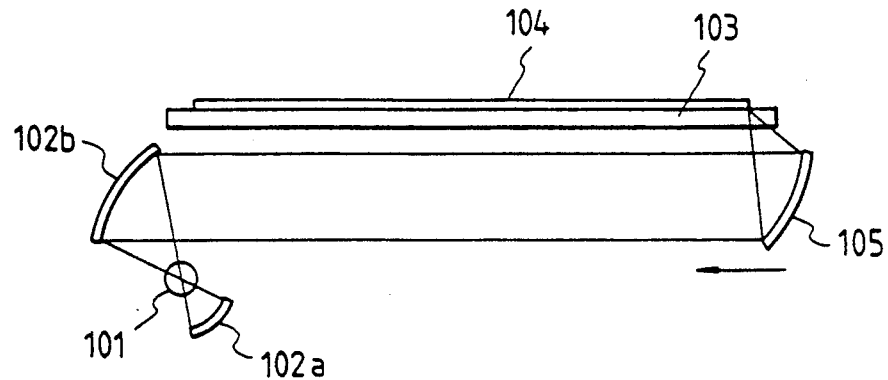
FIG. 18 is an elevational view of a conventional original scanning apparatus.
Figure 19:
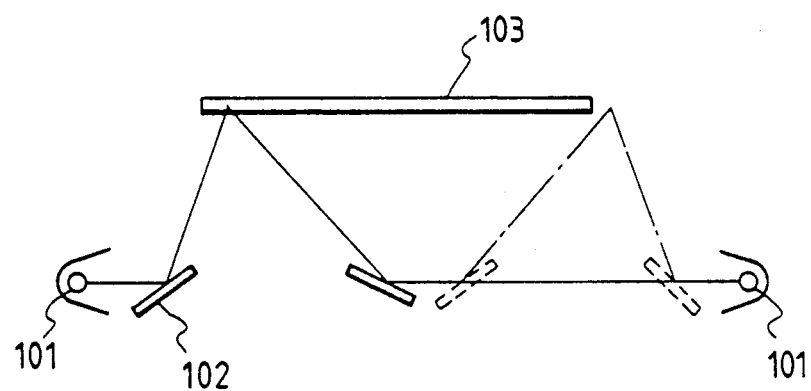
FIG. 19 is an elevational view of another conventional original scanning apparatus.
Figure 20:
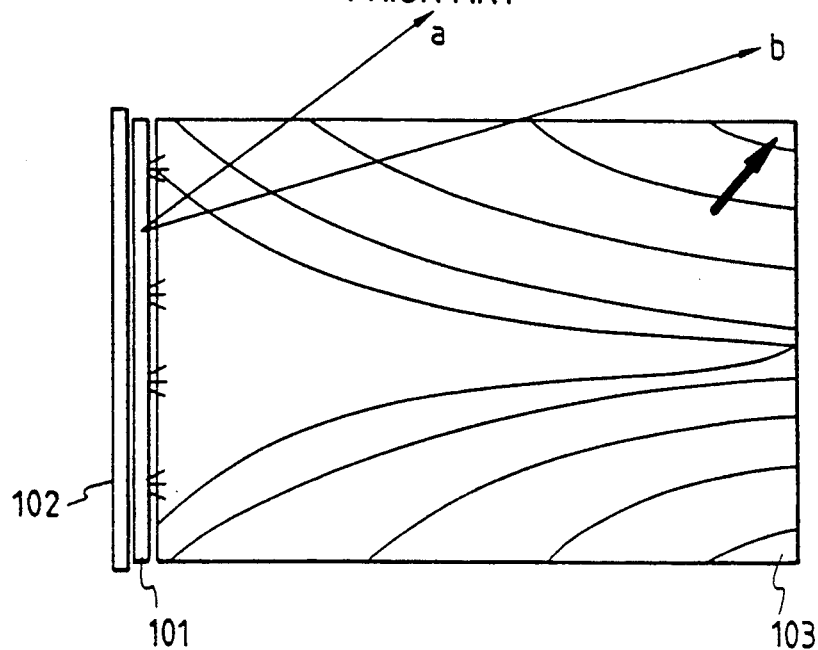
FIG. 20 is a view showing the distribution of the equi-illumination lines in the apparatus of FIG. 18.
Figure 21:
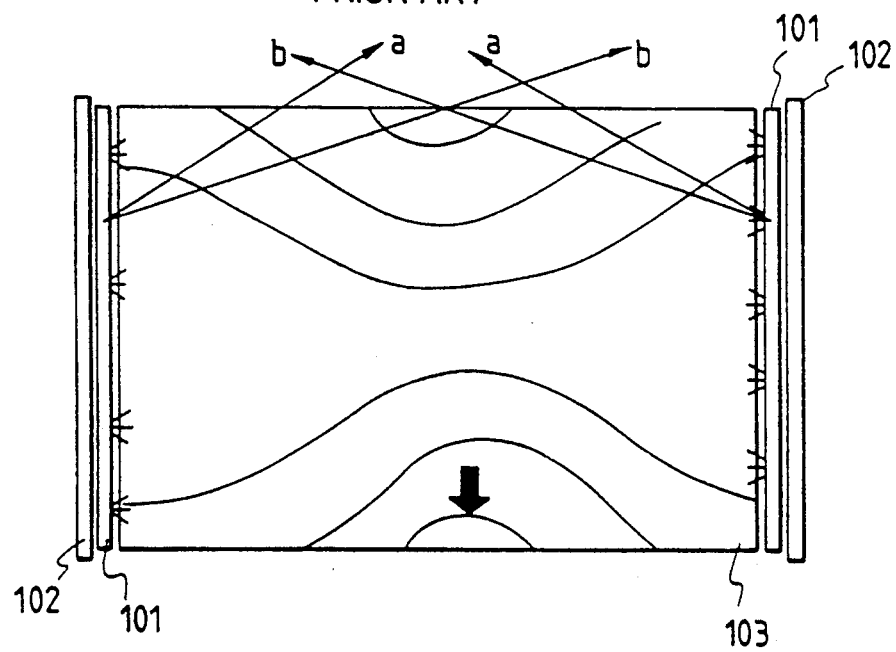
FIG. 21 is a view showing the distribution of the equi-illumination lines in the apparatus of FIG. 19.

Incidentally, FIG. 17B shows an embodiment wherein the positions of the flat mirror 18 and of the concave reflection hood 17 are changed.

While the present invention was explained in connection with the special embodiments, it is not limited to such embodiments, and, thus, various alterations or modifications can be effected within the scope of the present invention.

What is claimed is:

1. An original scanning apparatus comprising:
original support means on which an original is rested;
elongated light source means for illuminating the original rested on said original support means;
reflection means for reflecting light from said elongated light source means toward said original support means;
said elongated light source means being fixed and said reflection means being shiftable, so that the original rested on said original support means is scanned by shifting said reflection means; and
side reflector means disposed at a longitudinal end of said elongated light source means and extending along a shifting direction of said reflection means, wherein said side reflector means has a variable reflection area varied in accordance with a distance from said elongated light source means.

2. An original scanning apparatus according to claim 1, wherein said side reflector means are disposed at both longitudinal ends of said elongated light source means.

3. An original scanning apparatus, comprising:
original support means on which an original is rested;
elongated light source means for illuminating the original rested on said original support means;
reflection means for reflecting light from said elongated light source means toward said original support means;
said elongated light source means being fixed and said reflection means being shiftable, so that the original rested on said original support means is scanned by shifting said reflection means; and
side reflector means disposed at a longitudinal end of said elongated light source means and extending along a shifting direction of said reflection means, wherein said side reflector means has a reflection surface an angle of which is varied in accordance with a distance from said elongated light source means.

4. An original scanning apparatus according to claim 3, wherein said side reflector means are disposed at both longitudinal ends of said elongated light source means.

5. An original scanning apparatus, comprising:
original support means on which an original is rested;
elongated light source means for illuminating the original rested on said original support means;
reflection means for reflecting light from said elongated light source means toward said original support means;
said elongated light source means being fixed and said reflection means being shiftable, so that the original rested on said original support means is scanned by shifting said reflection means; and
side reflector means disposed at a longitudinal end of said elongated light source means and extending along a shifting direction of said reflection means, wherein said side reflector means comprises a Fresnel mirror of a reflection type.

6. An original scanning apparatus according to claim 5, wherein said side reflector means are disposed at both longitudinal ends of said elongated light source means.

7. An original scanning apparatus, comprising:
original support means on which an original is rested;
elongated light source means comprised of a plurality of luminous bodies arranged in a line;
reflection means for reflecting light from said elongated light source means toward said original support means;
said elongated light source means being fixed and said reflection means being shiftable, so that the original rested on said original support means is scanned by shifting said reflection means;
side reflector means disposed at a longitudinal end of said elongated light source means and extending along a shifting direction of said reflection means; and
a distance between said side reflector means and the outermost luminous body disposed at said longitudinal end of said elongated light source means being selected a half of a distance between the adjacent luminous bodies.

8. An original scanning apparatus according to claim 7, wherein said elongated light source means comprises a halogen lamp.

9. An original scanning apparatus according to claim 7, wherein said side reflector means is arranged perpendicular to said original support means and extends through the whole scanning area of the original.

10. An original scanning apparatus according to claim 7, wherein said side reflector means has a variable reflection area varied in accordance with a distance from said elongated light source means.

11. An original scanning apparatus according to claim 7, wherein said side reflector means has a reflection surface an angle of which is varied in accordance with a distance from said elongated light source means.

12. An original scanning apparatus according to claim 7, wherein said side reflector means comprises a Frennel mirror of reflection type.

13. An original scanning apparatus according to claim 7, wherein said side reflector means are disposed at both longitudinal ends of said elongated light source means.

14. An original scanning apparatus, comprising:
original support means on which an original is rested;
elongated light source means comprised of a plurality of luminous bodies arranged in a line;
movable reflection means for reflecting light from said elongated light source means toward said original support means;
a pair of side reflector means disposed at both longitudinal ends of said elongated light source means and extending along a shifting direction of said movable reflection means,
said elongated light source means being fixedly provided and said reflection means being constructed shiftable, so that the original rested on said original support means is scanned by shifting said reflection means; and
a shield member disposed between said elongated light source and said movable reflection means for blocking light from passing directly from said elongated light source means to said movable reflection means.

15. An original scanning apparatus according to claim 14, wherein a surface of said shield member facing said elongated light source means is light reflectable.

16. An original scanning apparatus according to claim 14, further including additional reflection means fixedly provided for reflecting light from said elongated light source means toward said movable reflection means.

17. An original scanning apparatus according to claim 16, wherein said fixedly provided reflection means has a cylindrical surface for collecting light from said elongated light source in a short direction of said elongated light source.

18. An original scanning apparatus according to claim 17, wherein said cylindrical surface of said fixedly provided reflection means has an elliptical configuration.

19. An original scanning apparatus according to claim 17, wherein said cylindrical surface of said fixedly provided reflection means has a parabolic configuration.

20. An original scanning apparatus according to claim 16, wherein said fixed reflection means has a plurality of reflection portions which are divided.

21. An original scanning apparatus according to claim 14, wherein said side reflector means has a variable reflection area varied in accordance with a distance from said elongated light source means.

22. An original scanning apparatus according to claim 14, wherein said side reflector means has a reflection surface an angle of which is varied in accordance with a distance from said elongated light source means.

23. An original scanning apparatus according to claim 14, wherein said side reflector means comprises a Fresnel mirror of reflection type.

24. An original scanning apparatus according to claim 14, wherein a distance between said side reflector means and the outermost luminous body disposed at said longitudinal end of said elongated light source means is a half of a distance between the adjacent luminous bodies.

25. An original scanning apparatus according to claim 14, wherein said elongated light source means comprises a halogen lamp.

26. An original scanning apparatus according to claim 14, wherein said movable reflection means has a plurality of reflection portions which are divided.

27. An original scanning apparatus, comprising:
original support means on which an original is rested;
elongated light source means comprised of a plurality of luminous bodies arranged in a line;
reflection means fixedly provided for reflecting light from said elongated light source;
movable reflection means for reflecting the light reflected by said fixedly provided reflection means toward said original support means;
a pair of side reflection means disposed at both longitudinal ends of said elongated light source means and extending along a shifting direction of said movable reflection means;
said elongated light source means being fixedly provided and said reflection means being shiftably provided, so that the original rested on said original support means is scanned by shifting said movable reflection means;
said fixed reflection means having a cylindrical surface for collecting the light from said elongated light source.

28. An original scanning apparatus according to claim 27, wherein said cylindrical surface of said fixedly provided reflection means has an elliptical configuration.

29. An original scanning apparatus according to claim 27, wherein said cylindrical surface of said fixedly provided reflection means has a parabolic configuration.

30. An original scanning apparatus according to claim 27, wherein a width in an upper-lower direction of said side reflection means is selected to be larger than a width in an upper-lower direction of said movable reflection means, and said side reflection means extend proximate to said original platen.

31. An original scanning apparatus according to claim 27, wherein a length of said side reflection means in the scanning direction extends from the position of said elongated light source located at a scan side of said movable reflection means where the scanning starts to the position of said movable reflection means where the scanning finishes.

32. An original scanning apparatus according to claim 27, wherein said fixedly provided reflection means is disposed above said elongated light source.

33. An original scanning apparatus according to claim 27, wherein said fixedly provided reflection means has a plurality of reflection portions which are divided.

34. An original scanning apparatus according to claim 27, wherein said movable reflection means has a plurality of reflection portions which are divided.

35. An original scanning apparatus according to claim 34, wherein said plural reflection portions of said movable reflection means are located at both sides of a position of the original to be illuminated, so that the light reflected at said reflection portions illuminates the illuminated position of original from both sides by a same rate.

* * * * *